United States Patent [19]

Blaimont et al.

[11] Patent Number: 5,563,589
[45] Date of Patent: Oct. 8, 1996

[54] REMOTE IDENTIFICATION DEVICE

[75] Inventors: Michel Blaimont; Yves Canal, both of Velizy; Jean Chenu, Cesson, all of France

[73] Assignee: Thomson-CSF, Paris, France

[21] Appl. No.: 352,640

[22] Filed: Dec. 9, 1994

[30] Foreign Application Priority Data

Dec. 10, 1993 [FR] France .................. 93 14867

[51] Int. Cl.$^6$ .................................................. G08G 1/01
[52] U.S. Cl. .................. 340/933; 340/901; 340/902; 340/905; 340/825.54; 342/42; 342/44
[58] Field of Search .................. 342/41, 43, 44, 342/51, 193, 42; 341/173, 176; 340/901, 902, 905, 933, 825.54, 571, 572, 445, 447; 343/850

[56] References Cited

U.S. PATENT DOCUMENTS

| | | |
|---|---|---|
| 4,001,822 | 1/1977 | Sterzer . |
| 4,104,630 | 8/1978 | Chaser ........................ 342/44 |
| 4,114,151 | 9/1978 | Denne et al. ............... 342/42 |
| 4,388,524 | 6/1983 | Walton ........................ 342/44 |
| 4,631,708 | 12/1986 | Wood et al. ................. 342/42 |
| 4,656,472 | 4/1987 | Walton ........................ 342/44 |
| 4,786,707 | 11/1988 | Koelle ......................... 342/44 |
| 4,912,471 | 3/1990 | Tyburski et al. ............ 342/42 |

FOREIGN PATENT DOCUMENTS

| | | |
|---|---|---|
| 0412884A1 | 2/1991 | European Pat. Off. . |
| 0480413A2 | 4/1992 | European Pat. Off. . |

OTHER PUBLICATIONS

J. G. Nolan, et al., "A Radiation Powered Single Chip EEPROM ID Code Transceiver", Proceedings of the IEEE 1987 Custom Integrated Circuits Conference, May 4–7, 1987, pp. 684–686.

Primary Examiner—Thomas Mullen
Assistant Examiner—Van Thanh Trieu
Attorney, Agent, or Firm—Oblon, Spivak, McClelland, Maier & Neustadt, P.C.

[57] ABSTRACT

In a remote identification device, an interrogator sends a microwave signal to a responder, the interrogation wave signal being modulated. At each period of the modulation signal of the interrogation wave signal, the responder accumulates the energy conveyed by this signal, the energy received being converted into supply voltage to be used to encode and transmit a response microwave signal to the interrogator. This may be used for the identification of objects by a radar signal.

10 Claims, 4 Drawing Sheets

REMOTE IDENTIFICATION DEVICE

BACKGROUND OF THE INVENTION

The present invention relates to a remote identification device. It can be applied notably to the identification of objects such as vehicles for example, the identification being done in a interrogation-and-response process by means of radar signals between an interrogation transmitter and an object to be identified, the identification requiring no energy source on the part of the object to be identified, the transmitter and this object to be identified being possibly separated by a long distance of the order of several hundreds of meters for example.

The identification of vehicles notably is generally done by sight and therefore requires human activity. This identification is therefore highly dependent on the eyesight of the person making the identification, the cleanness of the identification plate of the vehicle and local visibility in particular. Photographic methods may replace human intervention but then the latter two constraints still remain.

At short distances, there are many types of equipment capable of automatically and reliably identifying an object provided with a passive responder. An example that may be cited is that of certain anti-theft systems with which big dispensing machines in particular are equipped. These systems interact remotely with a diode. However, the interaction distance of these systems is only a few meters because, beyond a certain distance, the energy received by the diode is too small to create a voltage that exceeds its threshold voltage. It would be possible, for example, to increase the distance of the radar that sends the interrogation signal to increase the range of the systems using passive responders. However, these systems would then no longer be compatible with a short-range operation for there is the risk that the responder might be destroyed by the power received, notably at its detection diode.

For long distances, automatic identification systems based on interrogation and response always require an energy source proper to and associated with the responder.

SUMMARY OF THE INVENTION

The aim of the invention is to overcome the above-mentioned drawbacks by enabling an identification in the form of interrogation and response at long range not requiring that the responder, namely the object to be identified, should be equipped with its own energy source to enable this identification.

To this end, an object of the invention is a remote identification device, comprising an interrogator and a responder, the interrogator sending an interrogation microwave signal to the responder, wherein the interrogator has modulating means to modulate the interrogation microwave signal and wherein the responder has accumulation means for the accumulation, at each period of the signal that modulates the interrogation microwave signal, of the energy carried by this microwave signal, the responder furthermore having means to convert the energy received into supply voltage for means to encode and transmit a response microwave signal to the interrogator.

The main advantages of the invention are that it works at short distances as well as at long distances, is independent of atmospheric conditions, simple to implement and economical.

BRIEF DESCRIPTION OF THE DRAWINGS

Other features and advantages of the invention shall appear from the following description, made with reference to the appended drawings of which.

DESCRIPTION OF THE INVENTION

Figure 1:
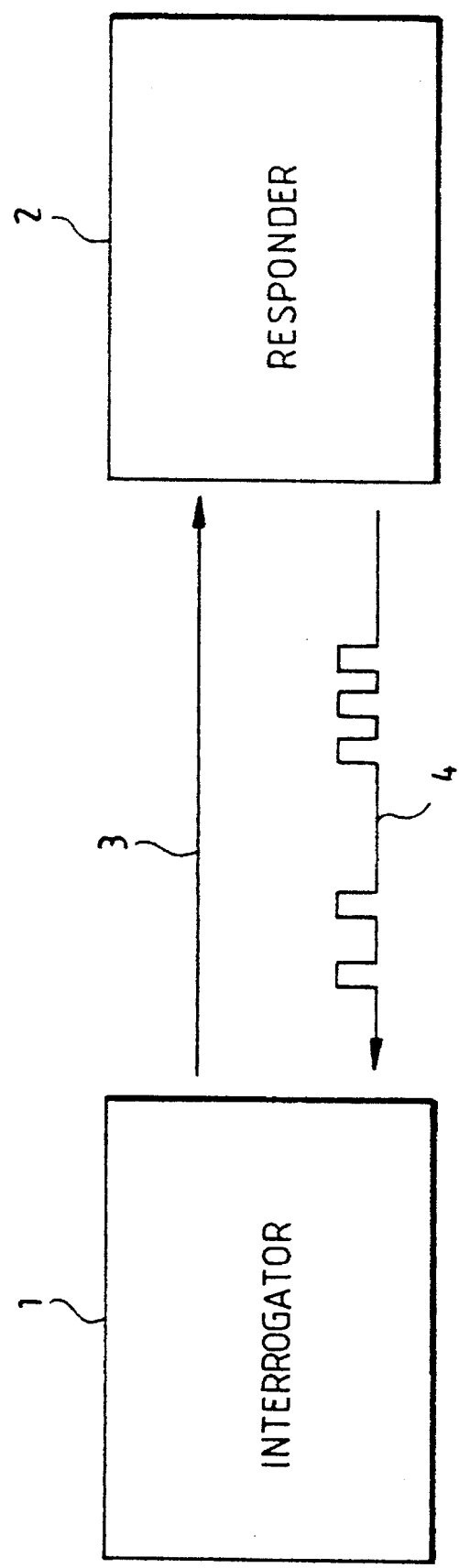
FIG. 1 shows the principle of a remote identification device.

FIG. 1 illustrates the principle of a remote identification device where an interrogator system 1 has the task of identifying a responder 2 located at a distance. The interrogator I sends the responder 2 a microwave signal 3. In response, the responder 2 sends the interrogator 1 a microwave signal 4 modulated by an encoding signal representing, for example, a given number of bits in series, these bits encoding the identification number of the responder 2.

Figure 2:
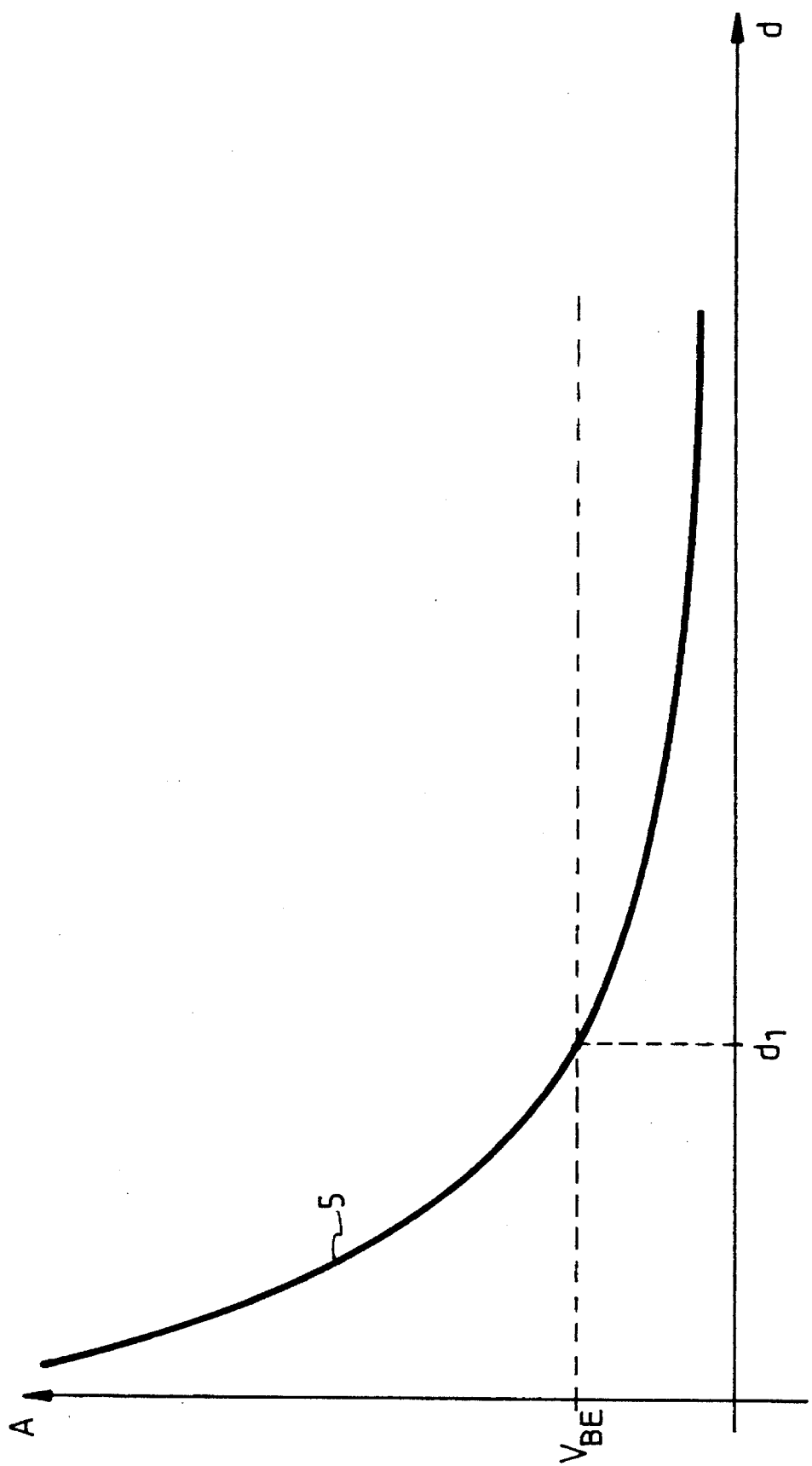
FIG. 2 is a curve showing the shape of the energy received by a responder as a function of its distance from the interrogator.

FIG. 2 presents a curve 5 illustrating the shape of the energy received by the responder 2 as a function of its distance d from the interrogator 1, the energy being that given by the interrogation microwave signal 3. More specifically, the curve 5 illustrates the shape of the amplitude A of a supply voltage obtained from the energy of the interrogation microwave signal 3. This voltage having the amplitude A supplies notably the semiconductor circuits used for the encoding and re-transmission of the response microwave signal 4. The amplitude A varies inversely to the square $1/d^2$ of the distance d between the interrogator 1 and the responder 2. For a distance $d_1$ the amplitude A thus becomes lower than the voltage $V_{BE}$ of operation of the semiconductors of the responder 2, this voltage $V_{BE}$ ranging, for example, from 0.5 to 0.7 volts. The result thereof is that beyond this distance $d_1$ between the interrogator 1 and the responder 2, the responder 2, in principle, can no longer work without an independent source of energy. This distance $d_1$ may actually be very small, equal to a few millimeters for example, depending on the power sent out by the interrogator 1. Should the responder 2 be, for example, of the chip card type, this chip card may be provided with a lithium cell. However, this approach notably has the drawback wherein it is permanently difficult to find out if the cell is charged or discharged. To circumvent the need for fitting out the responder 2 with an independent energy source, it would appear to be possible to increase the power of the interrogation signal 3 in order to increase the distance $d_1$ below which the semiconductors of the responder 2 no longer work. However, apart from the increase in energy, this approach would not work at small distances where the excessively great energy received by the responder would damage the semiconductors.

According to the invention, the power of the interrogation signal 3 is not necessarily increased but this signal is modulated by a signal which is a low-frequency signal for example. The responder 2 accumulates the necessary energy given by an alternating current at the frequency of the above-mentioned modulation signal and obtained from the microwave signal 3 which is modulated in order to create a voltage that is sufficiently high for the operation of the semiconductors used for the encoding and the transmission of the response signal. The alternating current charges, for example, a system based on coils and capacitors for the creation of this voltage.

Figure 3:
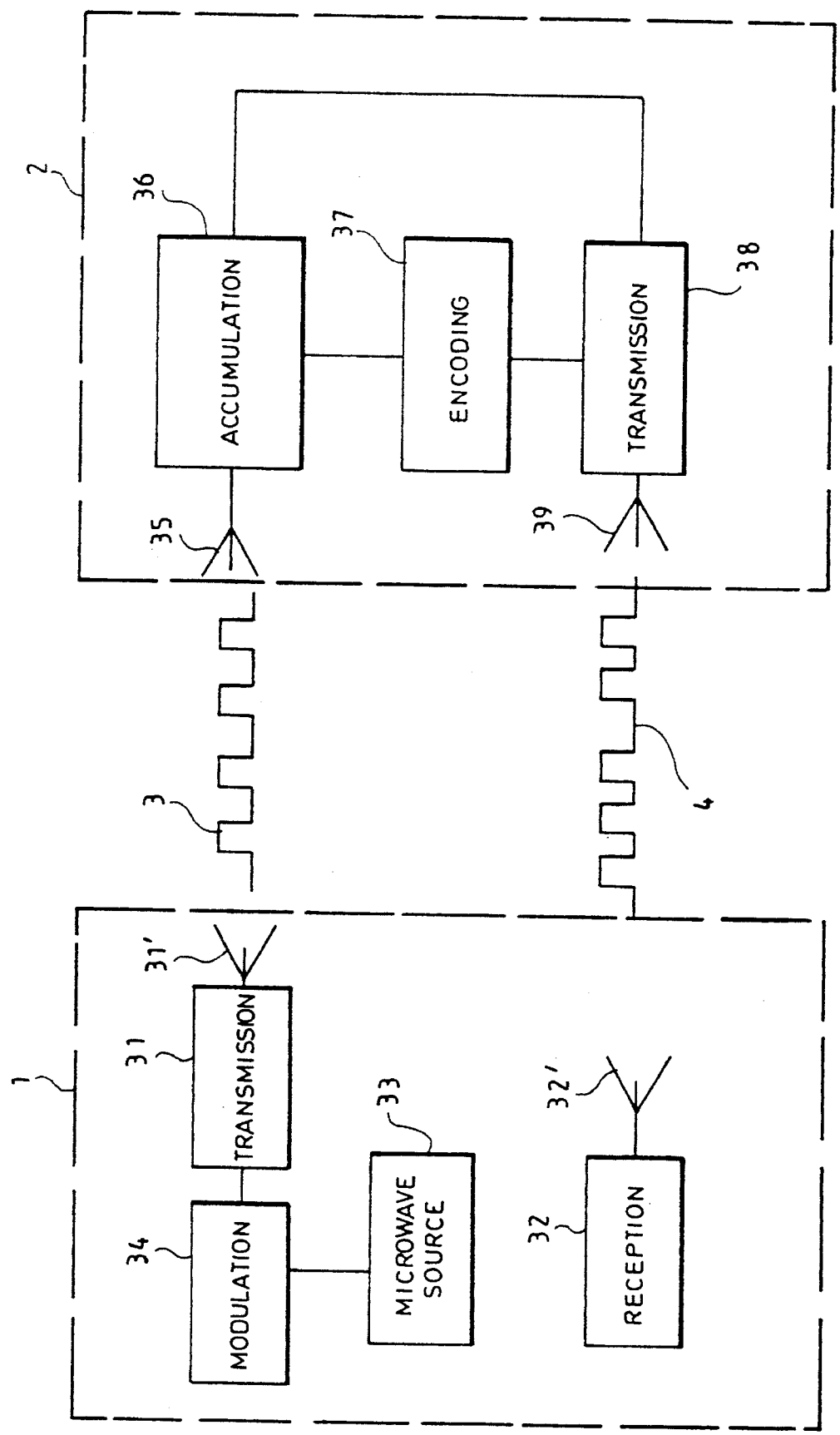
FIG. 3 is a block diagram of a device according to the invention.

FIG. 3 uses a block diagram to illustrate the working of a device according to the invention. Apart from the standard transmission means 31, reception means 32 which are each associated with an antenna 31', 32', and a microwave source 33, the interrogator 1 contains modulation means 34 placed for example between the microwave source 33 and the transmission means 31. The modulation means 34 modulate the interrogation microwave signal 3 sent out by the interrogator 1. The modulation signal is, for example, a square-wave signal. This modulation is done, for example, by a low-frequency signal equal to several tens of kilohertz for example. In addition to the above-mentioned means, the interrogator has, for example, processing means designed to process the identification responses received. Its two antennas 31', 32' may, for example, be the one and the same antenna.

The responder 2 receives the modulated interrogation microwave signal through an antenna 35. It has accumulation means 36 which, at each period of the modulation signal, accumulate the energy sent out by the interrogation microwave signal 3. As soon as the accumulated energy reaches the level needed to obtain the supply voltage for the working of the semiconductors of the encoding means 37 and transmission means 38 for example, these means encode and transmit the response wave signal 4 of the responder 2 towards the interrogator 1 by means of a transmission antenna 39 which, for example, may be one and the same as the reception antenna 35 of the responder 2. This responder 2 furthermore behaves like regulation means (not shown) enabling the regulation of the supply voltage of the semiconductors within a given range. The responder 2 furthermore comprises standard detection means (not shown) to detect the interrogation microwave signal 3.

Figure 4:
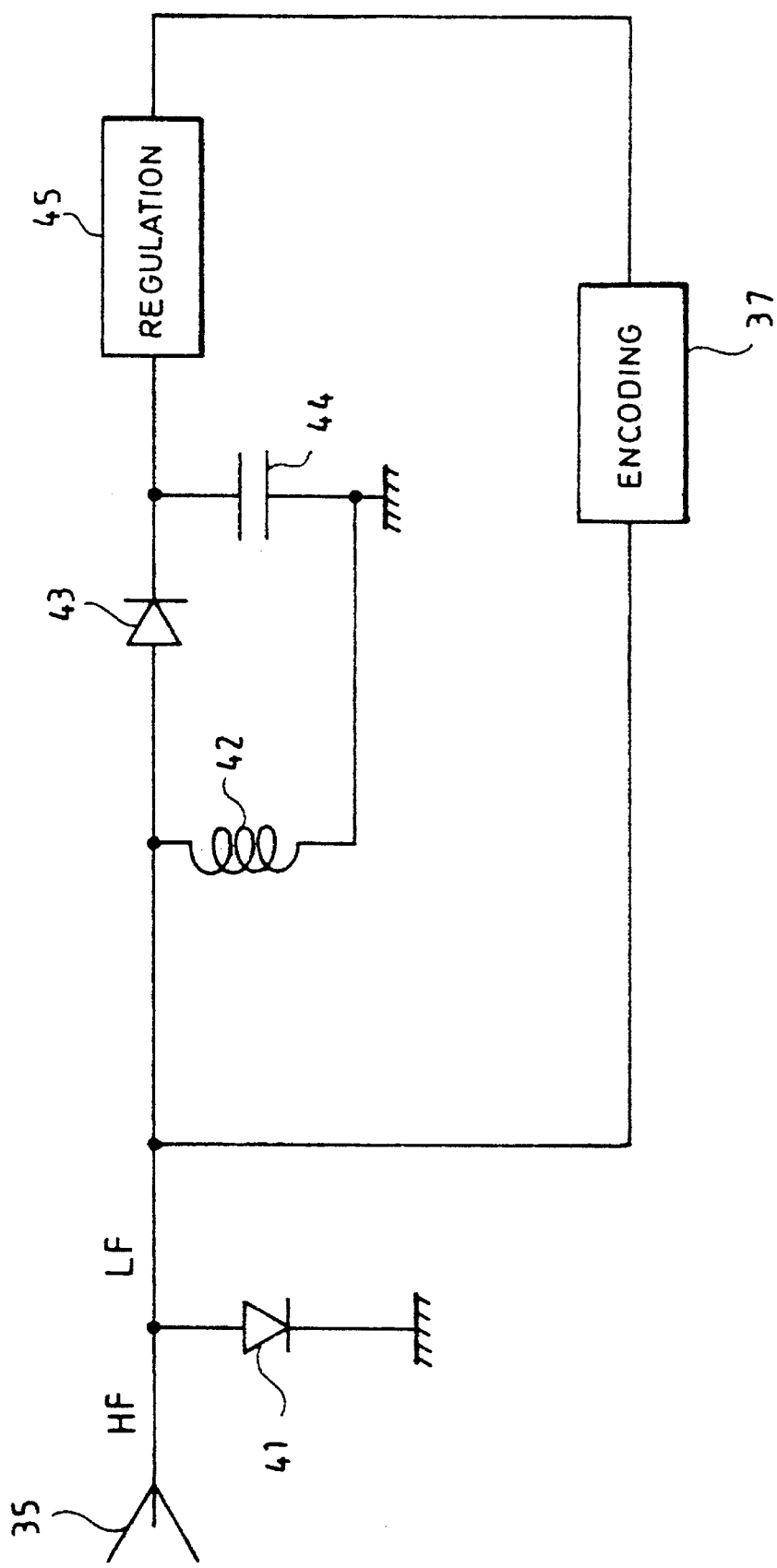
FIG. 4 shows a possible embodiment of a device according to the invention.

FIG. 4 illustrates a possible exemplary embodiment of a responder 2 forming part of a device according to the invention. In this embodiment, the responder has an antenna 35 used both for transmission and reception, connected to the anode of a detection diode 41 whose cathode is connected to a reference potential of the responder. The anode of the diode 41 is furthermore connected to a first terminal of an inductor 42 whose second terminal is connected to the reference potential of the responder. The signal between the antenna 35 and the detection diode 41 is a high-frequency signal HF that creates a low-frequency signal LF between the detection diode 41 and the inductor 42, this low frequency being that of the modulation signal to modulate the microwave signal 3 sent out by the interrogator 1. The low-frequency signal LF results in the flow of a current between the detection diode 41 and the inductor 42, the current charging this inductor with magnetic energy during each positive half-period for example. The inductor 42 is connected to the anode of a second diode 43 so as to discharge its magnetic energy, by a current, to a capacitor 44 during each negative half-period of the signal LF for example, the capacitor 44 having one terminal connected to the cathode of the second diode. This assembly of the inductor 42, the second diode 43 and the capacitor 44 enables the creation of a voltage from the low-frequency signal LF obtained at the detection diode 41. The inductor 42 may be replaced, for example, by a transformer whose primary winding is connected to the anode of the detection diode 41 and to the reference potential, and whose secondary winding is connected to the anode of the second diode 43 and to the reference potential, the primary winding storing the magnetic energy discharged by the secondary winding, there being possibly a transformer ratio, for example, between the two windings, the transformer being a step-up transformer for example.

Regulation means 45 are, for example, connected to the cathode of the second diode 43 and to the capacitor 44 to deliver a voltage in a given range of operation. This voltage notably supplies the encoding means 37. As soon as the supply voltage is set up, these encoding means 37 which contain, for example, the identification number of the responder, activate for example the detection diode 41 which is then, for example, used for a second function consisting notably of the creation of 0 or Π phase shifts on the received interrogation microwave signal according to the command given by the encoding means 37, the energy for the control of the diode 41 being notably obtained by the supply voltage produced by the inductor 42, or a transformer, by the second diode 43 and by the capacitor 44 and, possibly, by regulation means 45 if these means are used. These means 45 may be constituted, for example, by a diode-based limiter system or a regulation system using series-connected transistors. The above-mentioned 0 and Π phase shifts correspond, for example, respectively to the 0 and 1 bits encoding the identification number of the responder. The interrogation microwave signal received is then re-transmitted with these phase shifts which are detected by the interrogator 1 which then reconstitutes the identification code of the responder. By these 0 to ∪ phase shifts, the phase shifter actually modifies the standing wave ratio of its antenna 35, acting on the incident wave, which is the interrogation wave signal, like a deforming mirror. To prevent confusion between the modulation signal of the interrogation signal and the response signal re-transmitted by the responder with the above-mentioned phase shifts, the response signal may be, for example, translated in frequency by translation means, not shown but known to those skilled in the art, used to obtain a frequency shift to demarcate the interrogation signal from the response signal.

Since the energy needed by the responder 2 is transmitted by the interrogator 1, said interrogator acts like a switch to activate the putting into operation of the responder 2. After a interrogation-and-response cycle, the responder 2 notably returns to an inert state.

The responder of the device according to the invention thus works without any independent source of energy of its own while at the same time being capable of working at long distance from the interrogator, at several tens or hundreds of meters for example. It works at these distances without significantly increasing the power of the microwave signal sent out by the interrogator. This enables it to work also at short distances and therefore ultimately to work over a very great range of distances.

The responder 2 may, for example, be fitted into vehicles, the interrogator 1 being located in a fixed or mobile station. The responder may be very small in size. It may notably take the shape of a chip card. Indeed, since the response lasts for a very short time, the energy accumulation means may be contained in a very small volume.

What is claimed is:

1. A remote identification device, comprising an interrogator and a responder, the interrogator sending an interrogation microwave signal to the responder, wherein the interrogator has modulating means to modulate the interrogation microwave signal and wherein the responder has accumulation means for the accumulation, at each period of the signal that modulates the interrogation microwave signal, of the energy carrier by this microwave signal, said accumulation means being constituted by an inductor whose first terminal is connected to an anode of a detection diode of the interrogation microwave signal, the inductor being charged by a current at the frequency of the modulation signal, the responder furthermore having means to convert the energy received into voltage greater than the threshold voltages of semiconductors used by means for encoding and transmitting a response microwave signal to the interrogator.

2. A device according to claim 1, wherein the response microwave signal contains a code identifying the responder.

3. A device according to claim 1, wherein the inductor is the inductor of the primary winding of a transformer.

4. A device according to any of the preceding claims, wherein the means to convert the received energy into voltage are constituted by at least the inductor of a second diode whose anode is connected to the first terminal of the inductor and a capacitor whose first terminal is connected to the cathode of the second diode, the second terminal of the inductor and the second terminal of the capacitor being connected to a reference potential, the voltage being given between the terminals of the capacitor.

5. A device according to claim 4, wherein the voltage regulation means are connected to the terminals of the capacitor.

6. A device according to claim 1, wherein the detection diode is also used for the transmission of the response microwave signal, and wherein the detection diode phase-shifts the received interrogation microwave signal by 0 or $\Pi$ as a function of the command given by the encoding means.

7. A device according to claim 1, wherein the modulation signal is a square-wave signal.

8. A device according to claim 1, wherein the responder is fitted into a vehicle.

9. A device according to claim 1, wherein the responder takes the form of a chip card.

10. A device according to claim 1, wherein the response microwave signal is offset in frequency with respect to an interrogation microwave signal.

* * * * *